US012126065B2

(12) United States Patent
Liu et al.

(10) Patent No.: US 12,126,065 B2
(45) Date of Patent: Oct. 22, 2024

(54) PHASE SHIFTER, DRIVING METHOD THEREFOR, AND ANTENNA

(71) Applicants: Beijing BOE Technology Development Co., Ltd., Beijing (CN); BOE TECHNOLOGY GROUP CO., LTD., Beijing (CN)

(72) Inventors: Zongmin Liu, Beijing (CN); Yali Wang, Beijing (CN); Feng Qu, Beijing (CN); Biqi Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 419 days.

(21) Appl. No.: 17/638,968

(22) PCT Filed: Mar. 24, 2021

(86) PCT No.: PCT/CN2021/082615
§ 371 (c)(1),
(2) Date: Feb. 28, 2022

(87) PCT Pub. No.: WO2022/198481
PCT Pub. Date: Sep. 29, 2022

(65) Prior Publication Data

US 2023/0352804 A1 Nov. 2, 2023

(51) Int. Cl.
*H01P 1/18* (2006.01)
*H01Q 3/36* (2006.01)

(52) U.S. Cl.
CPC ................. *H01P 1/18* (2013.01); *H01Q 3/36* (2013.01)

(58) Field of Classification Search
CPC .................................... H01P 1/18; H01Q 3/36
USPC .......................................................... 342/372
See application file for complete search history.

(56) References Cited

U.S. PATENT DOCUMENTS

| | | | | |
|---|---|---|---|---|
| 9,972,905 | B2 * | 5/2018 | Schaffner ................. | H01Q 1/06 |
| 2005/0248423 | A1 | 11/2005 | Qian et al. | |
| 2007/0013466 | A1 | 1/2007 | Hersey et al. | |
| 2011/0273228 | A1 | 11/2011 | Kolias et al. | |

(Continued)

FOREIGN PATENT DOCUMENTS

| | | |
|---|---|---|
| CN | 112397854 A | 2/2021 |
| CN | 112448106 A | 3/2021 |

*Primary Examiner* — Harry K Liu
(74) *Attorney, Agent, or Firm* — HOUTTEMAN LAW LLC

(57) ABSTRACT

Provided are a phase shifter, a driving method therefor and an antenna. The phase shifter includes a first substrate and a second substrate, which are disposed opposite to each other, and a first dielectric layer disposed therebetween; the first substrate includes: a first base, and a first reference electrode layer disposed on a side of the first base close to the first dielectric layer, and including first reference electrodes insulated and spaced apart from one another and each having a first opening; the second substrate includes a second base, first transmission lines on the second base and spaced apart from one another; the first transmission lines are in one-to-one correspondence with the first reference electrodes; an orthographic projection of a first transmission end of each first transmission line on the second base at least partially overlaps that of the first opening corresponding thereto on the second base.

20 Claims, 7 Drawing Sheets

(56) References Cited

U.S. PATENT DOCUMENTS

| | | | |
|---|---|---|---|
| 2021/0367336 A1 | 11/2021 | Jia et al. | |
| 2021/0408680 A1* | 12/2021 | Xi | H01P 1/184 |
| 2022/0006166 A1 | 1/2022 | Li et al. | |

* cited by examiner

PHASE SHIFTER, DRIVING METHOD THEREFOR, AND ANTENNA

TECHNICAL FIELD

The present disclosure relates to the technical field of microwave transmission, and particularly relates to a phase shifter, a driving method for the phase shifter, and an antenna.

BACKGROUND

Phased array antennas are widely applied because of no need of precise moving parts of traditional mechanical scanning antennas. Due to the characteristics of low cost and low section, the phased array antennas adopting a liquid crystal phase shifter have become a research focus of the phased array antennas, but high loss of radio frequency signals caused by the use of the liquid crystal phase shifter is an inevitable problem. In order to meet a requirement of a ratio of a gain G of a system receiving antenna to an equivalent noise temperature T value, the gain can be increased by increasing the number of radiating elements to compensate for an insertion loss of the liquid crystal phase shifter. However, since each radiating element uses an individual phase shifter, and a driving voltage of the phase shifter is generally not lower than 15V, how to drive the high-voltage phase shifters of the massive radiating elements becomes a difficult problem.

SUMMARY

The present disclosure aims to solve at least one of the technical problems in the prior art, and provides a phase shifter which can separately drive a first reference electrode and a first transmission line, so that bias voltages can be separately input to the first reference electrode and the first transmission line corresponding to one of different regions according to phase shift amounts required for the different regions, and thus a sufficiently large voltage difference between the first reference electrode and the first transmission line can be generated to change a dielectric constant of a first dielectric layer, thereby achieving phase shift better.

In a first aspect, an embodiment of the present disclosure provides a phase shifter, which includes a first substrate and a second substrate, which are disposed opposite to each other, and a first dielectric layer disposed therebetween;

the first substrate includes: a first base, and a first reference electrode layer disposed on a side of the first base close to the first dielectric layer, the first reference electrode layer includes a plurality of first reference electrodes insulated and spaced apart from one another, and each first reference electrode is provided with a first opening; and the second substrate includes a second base, and a plurality of first transmission lines disposed on a side of the second base close to the first dielectric layer and spaced apart from one another;

the first transmission lines are in one-to-one correspondence with the first reference electrodes, and an orthographic projection of the first transmission line on the second base at least partially overlaps that of the first reference electrode corresponding to the first transmission line on the second base; and each first transmission line has a first transmission end and a second transmission end, and an orthographic projection of the first transmission end of each first transmission line on the second base at least partially overlaps that of the first opening of the first reference electrode corresponding to the first transmission line on the second base.

In the phase shifter provided by the embodiment of the present disclosure, since the first reference electrode layer is provided with the plurality of first reference electrodes, a first bias voltage can be independently input to each first reference electrode and then a second bias voltage can be independently input to each first transmission line according to the phase shift amounts required for the different regions, so that a sufficiently large voltage difference can be generated between the first reference electrode and the first transmission line, so as to change the dielectric constant of the first dielectric layer, thereby achieving phase shift better.

In some examples, each first reference electrode is further provided with a second opening, and an orthographic projection of the first opening on the second base does not overlap that of the second opening on the second base; and an orthographic projection of the second transmission end of each first transmission line on the second base at least partially overlaps that of the second opening of the first reference electrode corresponding to the first transmission line on the second base.

In some examples, the phase shifter further includes a first driving unit including a plurality of first channels, a part of the first channels are connected to the first transmission lines one to one, another part of the first channels are connected to the first reference electrodes one to one, and the first driving unit is configured to supply a first bias voltage to each first reference electrode through the first channel and supply a second bias voltage to each first transmission line through the first channel.

In some examples, the first substrate further includes a plurality of first bias lines disposed on the side of the first base close to the first dielectric layer, and each first bias line is connected between one first channel and one first reference electrode; and the second substrate further includes a plurality of second bias lines disposed on the side of the second base close to the first dielectric layer, and each second bias line is connected between one first channel and one first transmission line.

In some examples, the phase shifter further includes a first driving unit and a second driving unit; and the first driving unit includes a plurality of first channels, the first channels is connected to the first reference electrodes one to one, and the first driving unit is configured to supply a first bias voltage to each first reference electrode through the first channel; and the second driving unit includes a plurality of second channels, the second channels are connected to the first transmission lines one to one, and the second driving unit is configured to supply a second bias voltage to each first transmission line through the second channel.

In some examples, the first substrate further includes a plurality of first bias lines disposed on the side of the first base close to the first dielectric layer, and each first bias line is connected between one first channel and one first reference electrode; and the second substrate further includes a plurality of second bias lines on the side of the second base close to the first dielectric layer, and each second bias line is connected between one first channel and one first transmission line.

In some examples, each first transmission line further includes a transmission body; each of the first transmission end and the second transmission end has a first endpoint and a second endpoint, which are disposed opposite to each other; and the first endpoint of the first transmission end and that of the second transmission end are connected with two opposite ends of the transmission body respectively.

In some examples, the transmission body includes a planar spiral transmission line electrically connected with the first transmission end and the second transmission end.

In some examples, the transmission body includes at least one meandering line electrically connected with the first transmission end and the second transmission end; and an orthographic projection of the at least one meandering line on the first base has a portion intersecting with an extending direction of an orthographic projection of the first transmission end on the first base.

In a second aspect, an embodiment of the present disclosure further provides an antenna, which includes the above phase shifter.

In some examples, the antenna further includes a plurality of radiating elements, which are disposed on a side of the first base away from the first dielectric layer; and the radiating elements are in one-to-one correspondence with the first transmission lines, and an orthographic projection of the radiating element on the first base at least partially overlaps that of the first transmission end of the first transmission line corresponding to the radiating element on the first base.

In some examples, the radiating elements are in one-to-one correspondence with the first reference electrodes, and the orthographic projection of the radiating element on the first base at least partially overlaps that of the first reference electrode corresponding to the radiating element on the first base; and the orthographic projection of each radiating element on the first base at least partially overlaps that of the first opening of the first reference electrode corresponding to the radiating element on the first base.

In some examples, each first reference electrode is further provided with the second opening, and the orthographic projection of each radiating element on the first base does not overlap that of the second opening on the first base of the first reference electrode corresponding to the radiating element.

In some examples, the antenna further includes a third substrate disposed on the side of the first base away from the first dielectric layer;

the third substrate includes a third base, a plurality of radiating elements disposed on a side of the third base away from the first base, and a plurality of second transmission lines disposed on a side of the third base close to the first base; and the third base is provided therein with a plurality of first vias, and first ends of the second transmission line are connected to the radiating elements through the first vias one to one; and the second transmission lines are in one-to-one correspondence with the first transmission lines, and an orthographic projection of a second end of the second transmission line on the first base at least partially overlaps that of the first transmission line corresponding to the second transmission line on the first base.

In some examples, the antenna further includes a fourth substrate disposed on a side of the second base away from the first dielectric layer;

the fourth substrate includes a fourth base, a second reference electrode layer disposed on a side of the fourth base away from the second base, and a power-division transmission structure disposed on a side of the fourth base close to the second base; an orthographic projection of the power-division transmission structure on the second base at least partially overlaps that of the second reference electrode layer on the second base; and the power-division transmission structure includes one combining transmission line and a plurality of power-division transmission lines, and a first end of each of the plurality of power-division transmission lines is connected to a first end of the combining transmission line; and an orthographic projection of a second end of each power-division transmission line on the fourth base at least partially overlaps that of the second transmission end of one first transmission line.

In some examples, each first reference electrode is further provided with the second opening; the power-division transmission lines are in one-to-one correspondence with the first reference electrodes, and the orthographic projection of the second end of the power-division transmission line on the fourth base at least partially overlaps that of the second opening of the first reference electrode corresponding to the power-division transmission line on the fourth base.

In a third aspect, an embodiment of the present disclosure further provides a driving method for a phase shifter, which is applied to the above phase shifter and includes:

according to a phase shift amount required for a region where each first transmission line is located, separately inputting a corresponding first bias voltage to each first reference electrodes, and separately inputting a corresponding second bias voltage to each first transmission line.

DETAIL DESCRIPTION OF EMBODIMENTS

Figure 1:
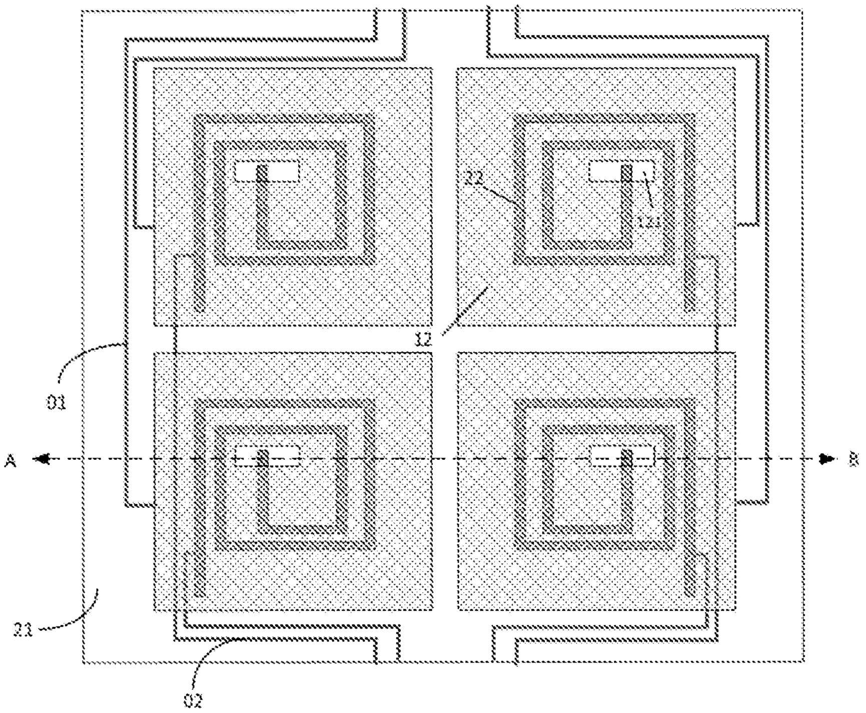
FIG. 1 is a schematic structural diagram of a phase shifter according to an embodiment of the present disclosure.

In order to make the objectives, technical solutions and advantages of the present disclosure clearer, the present disclosure will be described in detail below in conjunction with the drawings. Apparently, the embodiments described herein are merely some embodiments of the present disclosure, and do not cover all embodiments. All other embodiments derived by those of ordinary skill in the art from the embodiments described herein without inventive work fall within the scope of the present disclosure.

The shapes and sizes of the components in the drawings do not reflect a true scale, and are merely intended to facilitate an understanding of the contents of the embodiments of the present disclosure.

Unless otherwise defined, technical terms or scientific terms used herein should have general meanings that are understood by those of ordinary skill in the technical field of the present disclosure. The words "first", "second" and the like used herein do not denote any order, quantity or importance, but are just used to distinguish between different elements. Similarly, the words "one", "a", "the" and the like do not denote a limitation to quantity, and indicate the existence of "at least one" instead. The words "include", "comprise" and the like indicate that an element or object before the words covers the elements or objects or the equivalents thereof listed after the words, rather than excluding other elements or objects. The words "connect", "couple" and the like are not restricted to physical or mechanical connection, but may also indicate electrical connection, whether direct or indirect. The words "on", "under", "left", "right" and the like are only used to indicate relative positional relationships. When an absolute position of an object described is changed, the relative positional relationships may also be changed accordingly.

The embodiments of the present disclosure are not limited to those illustrated by the drawings, but include modifications to configuration formed based on a manufacturing process. Thus, the regions shown in the drawings are illustrative, and the shapes of the regions shown in the drawings illustrate specific shapes of the regions of the elements, but are not intended to make limitations.

Before describing the following embodiments, it should be noted that a first dielectric layer in a phase shifter provided in the following embodiments includes, but is not limited to, a liquid crystal layer, and a case where the first dielectric layer is the liquid crystal layer is merely taken as an example in the following description. When a first transmission end of a first transmission line in the phase shifter is used as a receiving end, a second transmission end of the first transmission line is used as a sending end; and when the second transmission end of the first transmission line is used as the receiving end, the first transmission end of the first transmission line is used as the sending end. In the following description, a case where the first transmission end of the transmission line is taken as the sending end and the second transmission end of the transmission line is taken as the receiving end is taken as an example for convenience of understanding, but the present disclosure is not limited thereto.

In addition, the first transmission line may be a delay line or a strip transmission line in the embodiments of the present disclosure. For convenience of description, the delay line is taken as an example of the first transmission line in the embodiments of the present disclosure, and a shape of the delay line includes, but is not limited to, any one or a combination of more than one of a bow shape, a wave shape and a zigzag shape.

Figure 5:
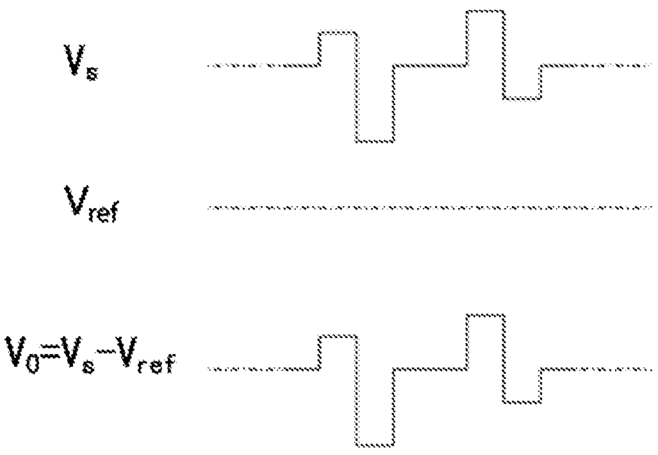
FIG. 5 is an exemplary bias voltage waveform of a phase shifter.
Figure 6:
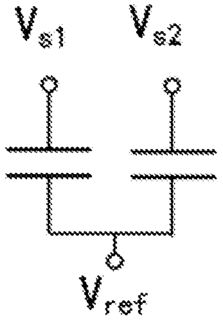
FIG. 6 is an exemplary schematic diagram illustrating a principle of loading bias voltages onto a phase shifter.

With reference to FIG. 5 and FIG. 6, in the related art, a first reference electrode layer of the phase shifter generally employs a surface electrode, and a plurality of transmission electrodes are disposed on a second substrate, an orthographic projection of the surface electrode on the second substrate covers an orthographic projection of each of the transmission electrodes on the second substrate, and a third bias voltage Vs is separately inputted to each transmission electrode by inputting a reference voltage Vref to the first reference electrode layer which is the surface electrode according to phase shift amounts required for different regions of the phase shifter, and FIG. 6 shows the principle of the above processes. FIG. 6 illustrates an example that two transmission electrodes receive the third bias voltage Vs1 and the third bias voltage Vs2 respectively, that is, first reference electrodes corresponding to all the transmission electrodes are at a common potential, and a driving voltage Vo for changing a dielectric constant of a first dielectric layer 3 in one region of the phase shifter is equal to a difference between the third bias voltage Vs received by the transmission electrode in the region and the reference voltage Vref. However, in order to offset an insertion loss of a liquid crystal phase shifter, the number of radiating elements is generally increased, and the number of transmission electrodes in the phase shifter is increased accordingly, so that a large number of transmission electrodes need to be driven. In such case, a driving voltage for display may be applied to the transmission electrodes for driving the same, but a voltage range of the driving voltage for display is usually small, for example, merely up to 18V, while a voltage range required by the driving voltage for driving the first dielectric layer which is the liquid crystal layer is large, for example, up to 30V. Therefore, under the condition that the first reference electrode layer for supplying the reference voltage to each transmission electrode is at the common potential, the voltage range of the driving voltage cannot satisfy the driving voltage required by the phase shifter.

In order to solve the above problem, an embodiment of the present disclosure provides a phase shifter, which is described below.

Figure 2:
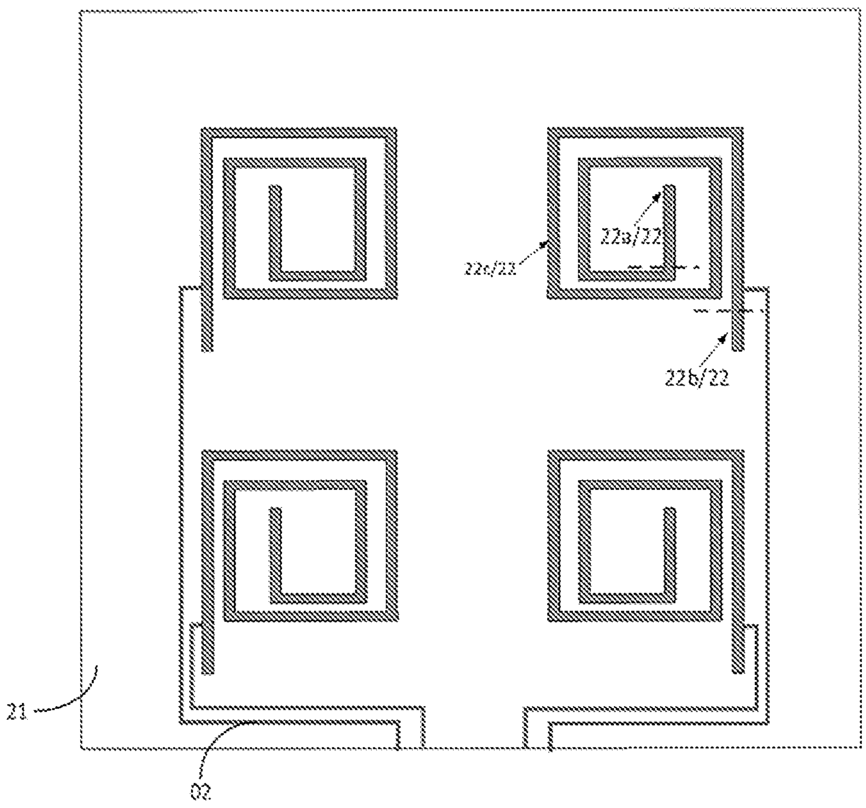
FIG. 2 is a schematic structural diagram of a second substrate of a phase shifter according to an embodiment of the present disclosure.
Figure 3:
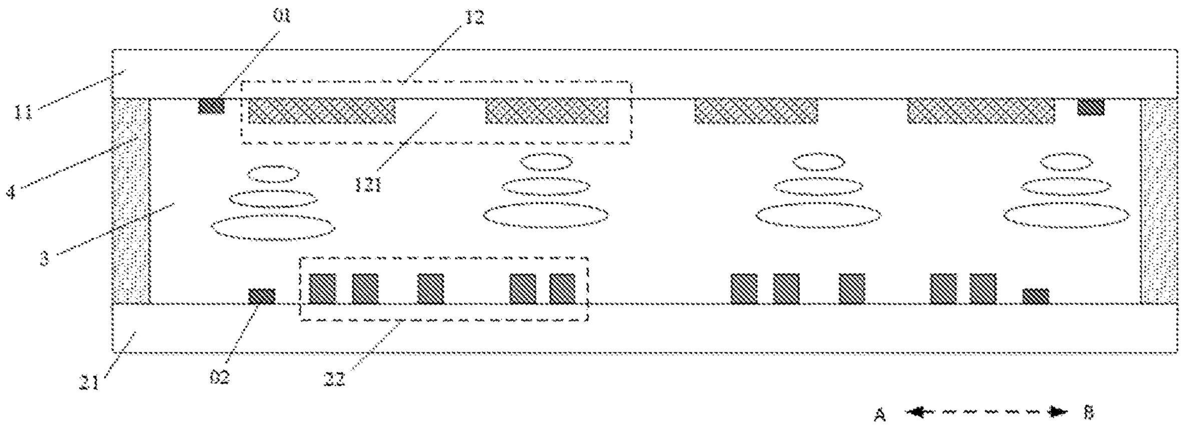
FIG. 3 is a sectional view taken along A-B direction of FIG. 1.

In a first aspect, with reference to FIG. 1 to FIG. 3, FIG. 3 is a sectional view taken along A-B direction of FIG. 1, and FIG. 2 is a schematic diagram of a planer structure of a second substrate according to an embodiment. The embodiment of the present disclosure provides a phase shifter, which includes a first substrate and a second substrate which are disposed opposite to each other, and a first dielectric layer 3 disposed between the first substrate and the second substrate. The first substrate includes a first base 11, and a first reference electrode layer disposed on a side of the first base 11 close to the first dielectric layer 3, and the first reference electrode layer includes a plurality of insulated first reference electrodes 12 spaced apart from one another, and each first reference electrode 12 is provided with a first opening 121.

The second substrate includes a second base 21, and a plurality of first transmission lines 22 disposed on a side of the second base 21 close to the first dielectric layer 3 and spaced apart from one another. The first transmission lines 22 are in one-to-one correspondence with the first reference electrodes 12, an orthographic projection of the first transmission line 22 on the second base 21 at least partially overlaps that of the first reference electrode 12 corresponding to the first transmission line 22 on the second base 21, and the first transmission line 22 and the first reference electrode 12 corresponding thereto form a phase shift unit. The phase shifter includes a plurality of phase shift units arranged in an array, and each phase shift unit is capable of independently adjusting a phase shift amount of a region where the phase shift unit is located.

Figure 7:
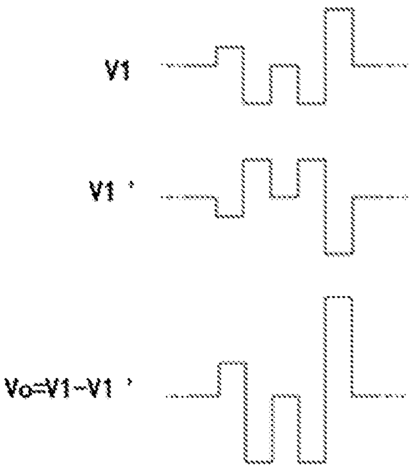
FIG. 7 is a bias voltage waveform of a phase shifter according to an embodiment of the present disclosure.
Figure 8:
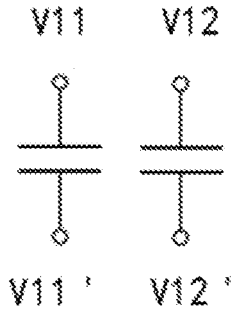
FIG. 8 is a schematic diagram illustrating a principle of loading bias voltages onto a phase shifter according to an embodiment of the present disclosure.

Since the plurality of first reference electrodes 12 are disposed on the side of the first base 11 close to the first dielectric layer 3 and spaced apart from one another, a first bias voltage V1 may be separately input to each first reference electrode 12 and then a second bias voltage V1' may be separately input to each first transmission line 22 according to the phase shift amounts required for the different regions of the phase shifter, so that a sufficiently large voltage difference can be generated between the first reference electrode 12 and the first transmission line 22 to change the dielectric constant of the first dielectric layer 3, thereby achieving phase shift better. Specifically, with reference to FIG. 7 and FIG. 8, FIG. 8 illustrates an example that two first reference electrodes 12 in the phase shifter receive first bias voltages V11 and V12 respectively and two first transmission lines 22 receive second bias voltages V11' and V12' respectively, the driving voltages Vo (Vo=V1−V1') for the regions where the different first transmission lines 22 of the phase shifter are located may be independently set, the driving voltage Vo for each region may be flexibly adjusted, and under the condition that a voltage range of a driving unit is not changed, a dynamic range of the voltage of the entire phase shifter may be expanded merely by changing polarities of the first bias voltage V1 and the second bias voltage V1', for example, the voltage range of the driving unit is 18V, 9V is taken as a reference voltage of the driving unit, and whether the polarities of the first bias voltage and the second bias voltage are positive or negative are determined with respect to the reference voltage, that is, the first bias voltage or the second bias voltage smaller than the reference voltage (9V) has a negative polarity, and the first bias voltage or the second bias voltage greater than or equal to the reference voltage (9V) has a positive polarity. The driving unit may input the first bias voltage V1 of 18V to the first reference electrode 12 of the region, where the polarity of the first bias voltage V1 is positive with respect to the driving unit, that is, 9V+9V; correspondingly, the second bias voltage V1' of 0V may be input to the first transmission line 22 of the region, where the polarity of the second bias voltage V1' is negative with respect to the driving unit, that is, 9V+(−9)V, then the driving voltage Vo of the region is 18V, and output voltage data of the driving unit for 0V and that for 18V are the same, i.e., 9V, but the polarities are opposite, so that the amount of the data of the driving unit may be reduced; further, by performing voltage inversion on each region of the phase shifter, for example, first bias voltages having opposite polarities are input to adjacent first reference electrodes 12 and second bias voltages having opposite polarities are input to adjacent first transmission lines 22, the dynamic range of the voltage of the entire phase shifter may be expanded, and polarization of liquid crystal molecules in the first dielectric layer 3 may also be avoided.

In some examples, with reference to FIG. 2, each first transmission line 22 has a first transmission end 22*a*, a second transmission end 22*b*, and a transmission body 22*c*; each of the first transmission end 22*a*, the second transmission end 22*b* and the transmission body 22*c* has a first endpoint and a second endpoint; the first endpoint of the first transmission end 22*a* is electrically connected to that of the transmission body 22*c*, and the first endpoint of the second transmission end 22*b* is electrically connected to the second endpoint of the transmission body 22*c*. It should be noted that the first endpoint and the second endpoint are relative concepts: if the first endpoint is a head end, the second endpoint is a tail end, and vice versa. In addition, in an implementation of the present disclosure, the first endpoint of the first transmission end 22*a* and that of the transmission body 22*c* are electrically connected to each other, in which case the first endpoint of the first transmission end 22*a* and that of the transmission body 22*c* may be a common endpoint. Accordingly, the first endpoint of the second transmission end 22*b* and the second endpoint of the transmission body 22*c* are electrically connected to each other, in which case the first endpoint of the second transmission end 22*b* and the second endpoint of the transmission body 22*c* are a common endpoint.

In some examples, when the first transmission end 22*a* serves as a sending end of a microwave signal, the second transmission end 22*b* serves as a receiving end of the microwave signal; accordingly, when the second transmission end 22*b* serves as the sending end of the microwave signal, the first transmission end 22*a* serves as the receiving end of the microwave signal. As described above, taking a case where the first transmission end 22*a* of the first transmission line 22 is the sending end as an example, an orthographic projection of the first transmission end 22*a* of each first transmission line 22 on the second base 21 at least partially overlaps that of the first opening 121 of the first reference electrode 12 corresponding to the first transmission line 22 on the second base 21, so that the microwave signal is received through the second transmission end 22*b* of the first transmission line 22 and then is transmitted to the first transmission end 22*a*, and the first transmission end 22*a* couples the microwave signal out of the phase shifter through the first opening 121 of the first reference electrode 12. In some examples, an extending direction of the orthographic projection of the first transmission end 22*a* on the second base 21 may penetrate through a center of the orthographic projection of the first opening 121 on the second base 21.

In some examples, the first opening 121 may be in any shape, for example, the first opening 121 may be a circular opening or a polygonal opening, and the polygonal opening includes a rectangular opening, a triangular opening, a trapezoidal opening, etc. If the first opening 121 is the polygonal opening, the orthographic projection of the first transmission end 22*a* on the second base 21 only overlaps one side of the orthographic projection of the first opening 121 on the second base 21; and if the first opening 121 is the circular opening, the orthographic projection of the first transmission end 22*a* on the second base 21 overlaps that of the first opening 121 on the second base 21 only at a point on a circular edge of the orthographic projection of the first opening 121.

Figure 4:
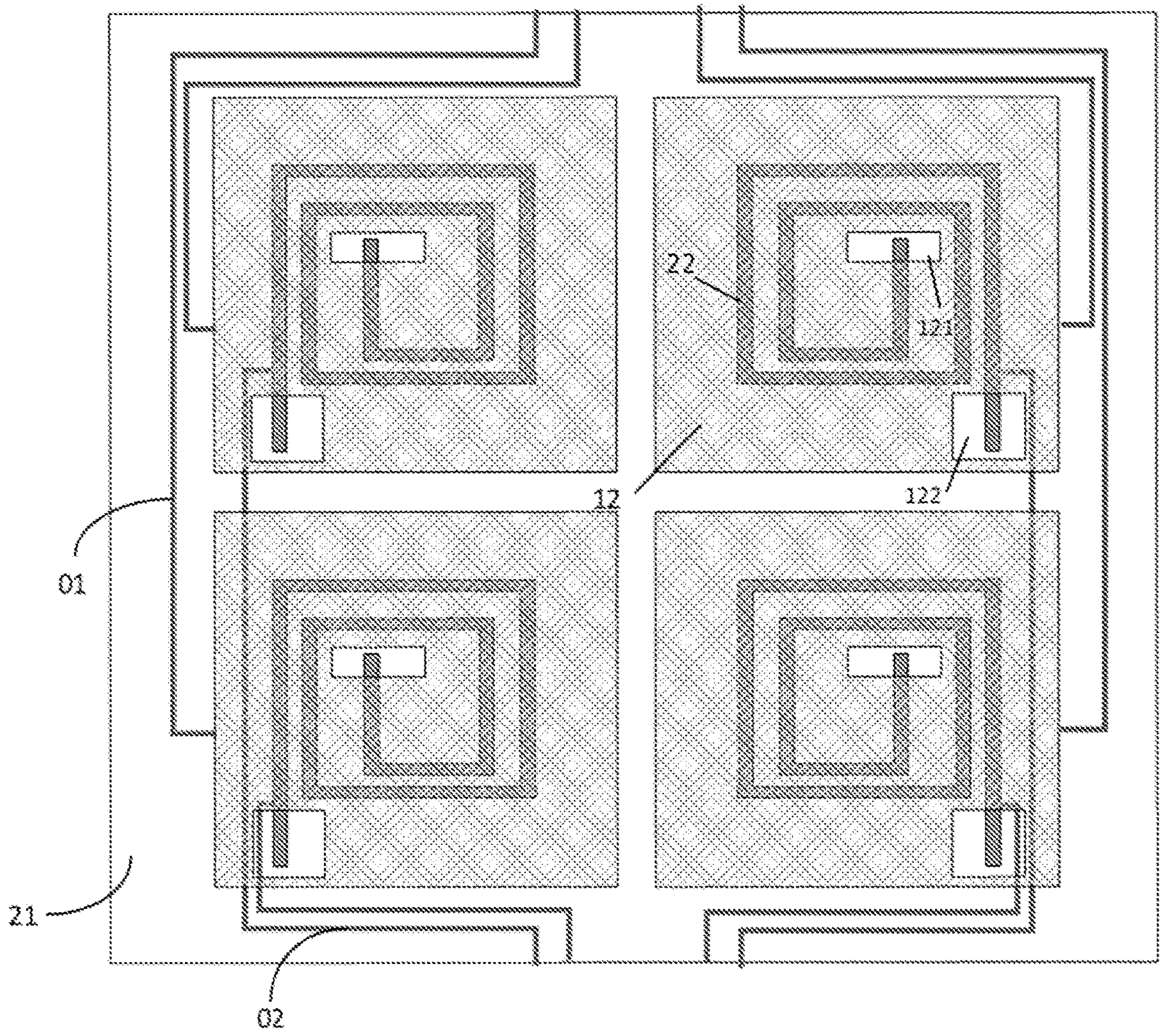
FIG. 4 is a schematic structural diagram of a phase shifter according to another embodiment of the present disclosure.

In some examples, with reference to FIG. 4, each first reference electrode 12 is further provided with a second opening 122, and the orthographic projection of the first opening 121 on the second base 21 does not overlap that of the second opening 122 on the second base 21. An orthographic projection of the second transmission end 22*b* of each first transmission line 22 on the second base 21 at least partially overlaps that of the second opening 122 of the first reference electrode 12 corresponding to the first transmission line 22 on the second base 21. In some examples, an extending direction of the orthographic projection of the second transmission end 22*b* on the second base 21 may penetrate through a center of the orthographic projection of the second opening 122 on the second base 21.

In some examples, the second opening 122 may be in any shape, for example, the second opening 122 may be a circular opening or a polygonal opening, and the polygonal opening includes a rectangular opening, a triangular opening, a trapezoidal opening, etc. If the second opening 122 is the polygonal opening, the orthographic projection of the second transmission end 22*b* on the second base 21 only overlaps one side of the orthographic projection of the second opening 122 on the second base 21; and if the second opening 122 is the circular opening, the orthographic projection of the second transmission end 22*b* on the second base 21 overlaps that of the second opening 122 on the second base 21 only at a point on a circular edge of the orthographic projection of the second opening 122.

In some examples, the first transmission line 22 may have a plurality of specific shapes, for example, with reference to FIG. 2, each first transmission line 22 has the first transmission end 22*a*, the second transmission end 22*b*, and the transmission body 22*c* electrically connecting the first transmission end 22*a* with the second transmission end 22*b*, and the transmission body 22*c* may include a planar spiral transmission line electrically connected to the first transmission end 22*a* and the second transmission end 22*b*.

Figure 11:
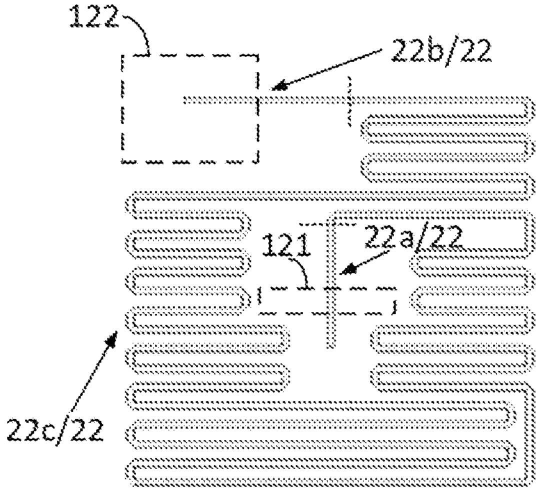
FIG. 11 is a schematic structural diagram of a first transmission line of a phase shifter according to an embodiment of the present disclosure.

As another example, with reference to FIG. 11, taking one first transmission line 22 in the phase shifter as an example for illustration, the transmission body 22*c* may include at least one meandering line electrically connected to the first transmission end 22*a* and the second transmission end 22*b*. The transmission body 22*c* includes, but is not limited to, the meandering line, and the number of the meandering lines may be one or more. A shape of the meandering line includes, but is not limited to, a bow shape and a wave shape.

In some examples, when the transmission body 22*c* includes a plurality of meandering lines, the shapes of the meandering lines are at least partially different from one another. That is, it is possible that a part of the plurality of meandering lines may have the same shape, or all of the plurality of meandering lines are different in shape.

In some examples, the transmission body 22*c* of the first transmission line 22 includes at least one meandering line electrically connected to the first transmission end 22*a* and the second transmission end 22*b*; and an orthographic projection of the at least one meandering line on the first base 11 has a portion intersecting with an extending direction of an orthographic projection of the first transmission end 22*a* on the first base 11. In such case, spaces occupied by the first transmission lines 22 in the phase shifter may be reduced, so that a volume of the phase shifter may be reduced. The transmission body 22*c* may also be in other shapes, such as a bow shape, a wave shape and a zigzag shape, but the shape of the transmission body 22*c* is not limited herein.

In some examples, with reference to FIG. 1 to FIG. 4, the first substrate further includes a plurality of first bias lines 01, which are disposed on the side of the first base 11 close to the first dielectric layer 3, and each first bias line 01 is connected to one of the first reference electrodes 12 to transmit the first bias voltage to the first reference electrode 12; correspondingly, the second substrate further includes a plurality of second bias lines 02, which are disposed on the side of the second base 21 close to the first dielectric layer 3, and each second bias line 02 is connected to one of the first transmission lines 22 to transmit the second bias voltage to the first transmission line 22. Thus, a direct-current electric field in a steady state is generated between the first transmission line 22 and the first reference electrode 12. Microscopically, axial orientations of the liquid crystal molecules in the first dielectric layer 3 which is the liquid crystal layer are deflected under the force of the electric field. Macroscopically, the dielectric constant of the first dielectric layer 3 which is the liquid crystal layer is changed, resulting in a change of a phase of a microwave signal when the microwave signal is transmitted between the first transmission line 22 and the first reference electrode 12. Specifically, the magnitude of the change of the phase of the microwave signal is positively correlated with deflection angles of the liquid crystal molecules and strength of the electric field, that is, the phase of the microwave signal may be changed by applying a direct-current bias voltage, which is an operating principle of the liquid crystal phase shifter.

It should be noted that, in the embodiments of the present disclosure, the phase shifter further includes a first wiring board and a second wiring board; the first wiring board is bonded and connected to the first substrate and is configured to supply the first bias voltage to the first bias line 01. The second wiring board is bonded and connected to the second substrate and is configured to supply the second bias voltage to a second bias line 02. Each of the first wiring board and the second wiring board may include various types of wiring boards, such as a Flexible Printed Circuit (FPC) board and a Printed Circuit Board (PCB), and the types of the first and second wiring boards are not limited herein. The first wiring board may be provided thereon with at least one first pad, one end of the first bias line 01 is connected (i.e., bonded) to the first pad, and the other end of the first bias line 01 is connected to one first reference electrode 12; and the second wiring board may also be provided thereon with at least one second pad, one end of the second bias line 02 is connected (i.e., bonded) to the second pad, and the other end of the second bias line 02 is connected to one first transmission line 22.

In some examples, orthographic projections of all the first bias lines 01 on the first base 11 do not overlap one another; and orthographic projections of the second bias lines 02 on the second base 21 do not overlap one another.

Figure 9:
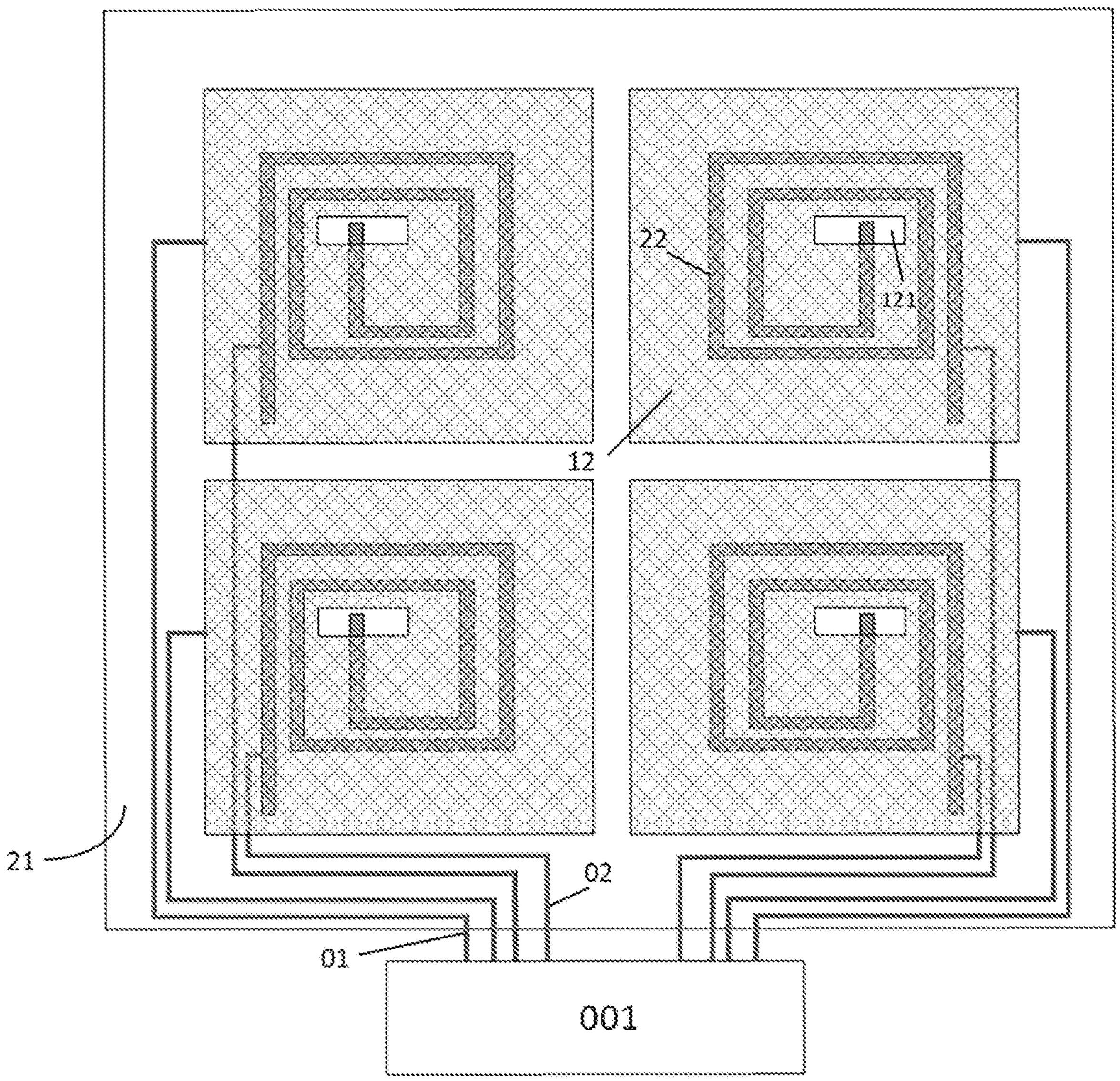
FIG. 9 is a schematic structural diagram of a phase shifter according to another embodiment of the present disclosure.

In some examples, with reference to FIG. 9, the phase shifter further includes a first driving unit 001 including a plurality of first channels, the first channels of the first driving unit 001 are connected to a portion of the first transmission lines 22 one to one, the first channels of the first driving unit 001 are connected to another portion of the first reference electrodes 12 one to one, and the first channels connected to all the first transmission lines 22 are not the same as those connected to all the first reference electrodes 12. The first driving unit 001 is configured to supply the first bias voltage to each first reference electrode 12 through the first channels and supply the second bias voltage to each first transmission line 22 through the first channels. Specifically, the first channels may be connected to the first reference electrodes 12 through the first bias line 01 one to one, that is, the first ends of the first bias lines 01 are connected to the the first channels of the first driving unit 001 one to one, and second ends of the first bias lines 01 are connected to the first reference electrodes 12 one by one; correspondingly, the first channels may be connected to the first transmission lines 22 through the second bias lines 02 one to one, that is, first ends of the second bias lines 02 are connected to the first channels of the first driving unit 001 one to one, and second ends of the second bias lines 02 are connected to the first transmission lines 22 one to one.

Figure 10:
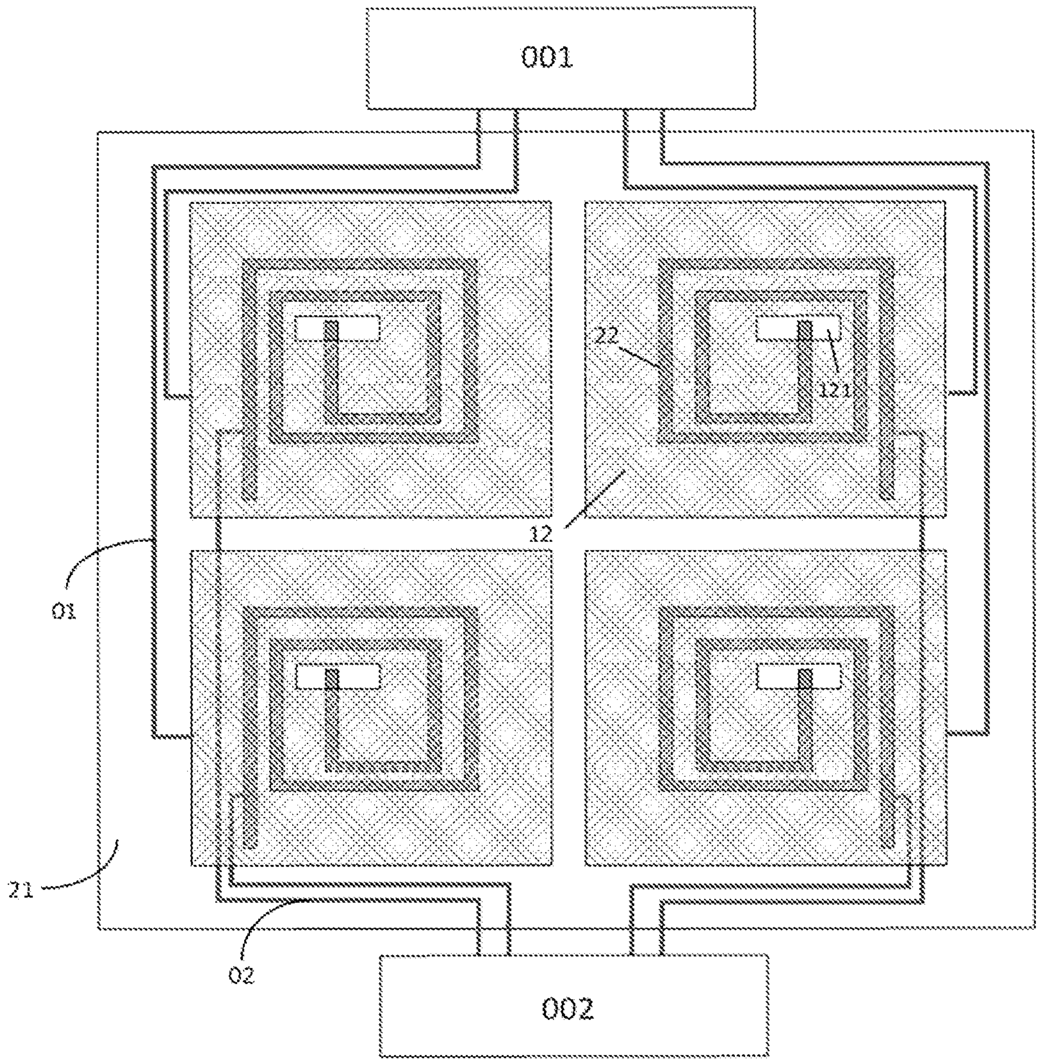
FIG. 10 is another schematic structural diagram of a phase shifter according to another embodiment of the present disclosure.

In some examples, two driving units may be disposed to drive the first reference electrodes 12 and the first transmission lines 22, respectively. With reference to FIG. 10, the phase shifter further includes a first driving unit 001 and a second driving unit 002. The first driving unit 001 includes a plurality of first channels, the first channels of the first driving unit 001 are connected to the first reference electrodes 12 one to one, and the first driving unit 001 is configured to supply the first bias voltage to each first reference electrode 12 through the first channels; correspondingly, the second driving unit 002 includes a plurality of second channels, the second channels of the second driving unit 002 are connected to the first transmission lines 22, and the second driving unit 002 is configured to supply the second bias voltage to each first transmission line 22 through the second channels. Specifically, the first channels may be connected to the first reference electrodes 12 through the first bias lines 01 one to one, that is, the first ends of the first bias line 01 are connected to the first channels of the first driving unit 001 one to one, and the second ends of the first bias lines 01 are connected to the first reference electrodes 12 one to one; correspondingly, the second channels may be connected to the first transmission lines 22 through the second bias lines 02 one to one, that is, the first ends of the second bias lines 02 are connected to the second channels of the second driving unit 002 one to one, and the second ends of the second bias lines 02 are connected to the first transmission lines 22 one to one.

Figure 12:
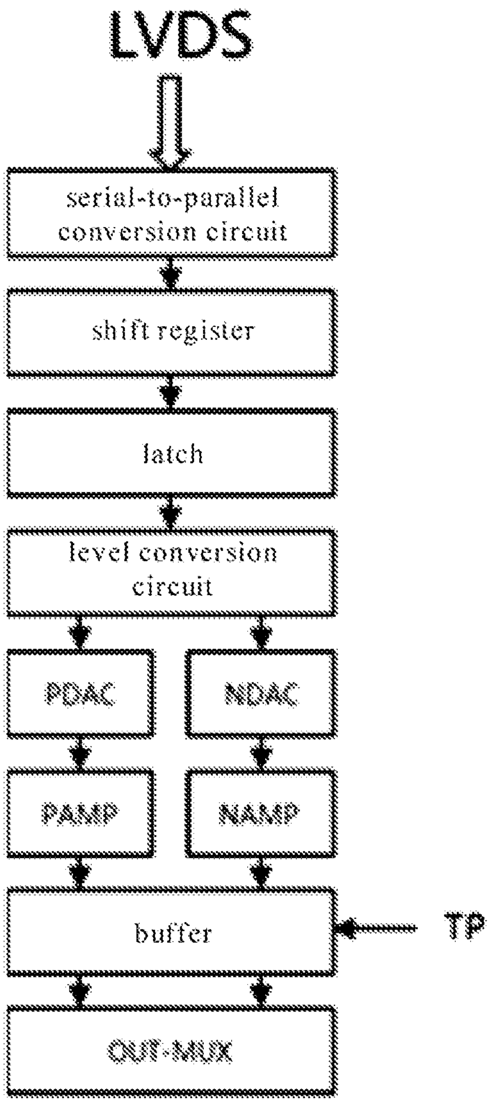
FIG. 12 is a schematic diagram illustrating an operating principle of a driving unit of a phase shifter according to an embodiment of the present disclosure.

With reference to FIG. 12, the first driving unit 001 and/or the second driving unit 002 may be a drive chip, and may be specifically a drive chip for display. Taking the first driving unit 001 as an example, the first driving unit 001 includes a serial-to-parallel conversion circuit, a shift register, a latch, a level conversion circuit, a positive voltage digital-to-analog converter (PDAC), a positive voltage amplifier (PAMP), a negative voltage digital-to-analog converter (NDAC), a negative voltage amplifier (NAMP), a buffer, and an output multiplexer (OUT-MUX). An operating principle of the first driving unit 001 for supplying the bias voltage is as follows: a bias voltage corresponding to the first bias voltage is input to the first driving unit 001 in a Low-Voltage Differential Signaling (LVDS) format, the LVDS signal passes through the serial-to-parallel conversion circuit, the bias voltage signal transmitted through each first channel in a serial mode is converted into the bias voltage signal transmitted in a parallel mode, and the bias voltage signals for the plurality of first channels are sequentially stored in the shift register and then sequentially output to the latch for temporary storage; each bias voltage signal is converted by the level conversion circuit into a voltage value required by the first reference electrode 12 or the first transmission line 22, the bias voltages are then transmitted to the PDAC or the NDAC according to the polarity of the first bias voltage required by the first reference electrode 12 or the polarity of the second bias voltage required by the first transmission line 22 to generate a positive bias voltage or a negative bias voltage through digital-to-analog conversion, the positive bias voltage or the negative bias voltage is stored in the buffer after being amplified, and then the positive bias voltage or the negative bias voltage is transmitted to the first reference electrode 12 or the first transmission line 22 connected to the selected first channel under the control of a control signal TP through a corresponding first channel selected by the output multiplexer. In summary, the bias voltage may be separately supplied to each first reference electrode 12 or each first transmission line 22 with the above method through the different first channels of the first driving unit 001, or the bias voltages may be separately supplied to each first reference electrode 12 and each first transmission line 22 with the above method through two driving units respectively, so that a range of an output voltage of the first driving unit 001 or the second driving unit 002 may be expanded only by changing the polarities of the first bias voltage and the second bias voltage, and thus a sufficient voltage difference may be provided to change the dielectric constant of the first dielectric layer 3 to achieve phase shift.

In some examples, the first driving unit 001 and/or the second driving unit 002 may specifically be an HX8157 drive chip of HIMAX, and may be specifically set according to phase shift performance required by the phase shifter.

Figure 13:
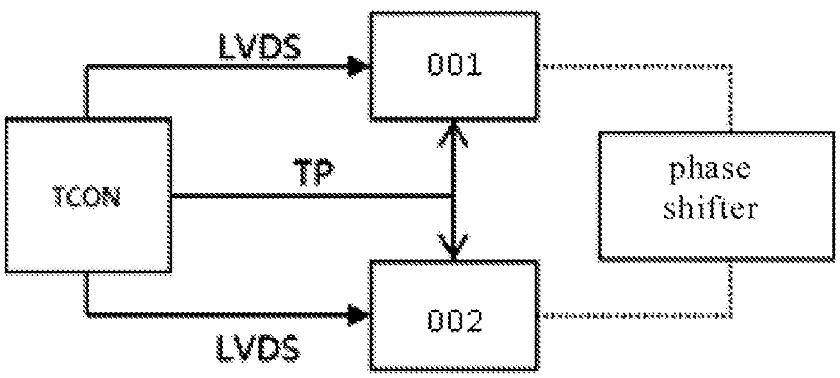
FIG. 13 is a schematic diagram illustrating an operating principle of a control unit of a phase shifter according to an embodiment of the present disclosure.

In some examples, with reference to FIG. 13, the phase shifter provided by the embodiment of the present disclosure may further include a control unit connected to the first driving unit 001 and/or the second driving unit 002, and the control unit is configured to supply a control signal TP to the first driving unit 001 and/or the second driving unit 002 and output a signal in the LVDS format, so as to control the first driving unit 001 and/or the second driving unit 002 to generate and output the bias voltages. The control unit may be a Timing Controller (TCON) or a programmable logic device (e.g., a Field-Programmable Gate Array (FPGA)), which is not limited herein.

In some examples, the first reference electrode 12 may be made of a metal material, such as any one of copper, aluminum, gold and silver. A thickness of the first reference electrode 12 is about 0.1 μm to 100 μm. The parameters of the first reference electrode 12, such as the specific material and the specific thickness, may be specifically set according to requirements for the size and the performance of the phase shifter.

In some examples, in addition to including the above structures, the phase shifter further includes a support structure (not shown) and a sealant 4; the sealant 4 is disposed between the first substrate and the second substrate in a peripheral region and surrounds a microwave transmission region and is configured to seal a liquid crystal cell (the first dielectric layer 3 is the liquid crystal layer) of the phase shifter; and the support structure is disposed between the first substrate and the second substrate, there may be a plurality of support structures, and all the support structures are spaced apart from one another in the microwave transmission region for maintaining a thickness of the liquid crystal cell.

In some examples, the support structure in the embodiment of the present disclosure may be made of an organic material and have certain elasticity, so as to avoid the problem of breakage of the first base 11 and the second base 21 due to an external force when the phase shifter is pressed. Further, appropriate spherical particles may be added to the support structure, so as to guarantee stability of the support structure while the support structure maintains the thickness of the liquid crystal cell.

In some examples, the first bias line 01 and/or the second bias line 02 are/is made of a high-resistance material, and the electric field generated by the first bias line 01 and/or the second bias line 02 and the first reference electrode 1 when the bias voltage is applied to the first bias line 01 and/or the second bias line 02 is only configured to drive the liquid crystal molecules in the first dielectric layer 3 to deflect, and is equivalent to an open circuit for the microwave signal transmitted by the phase shifter, that is, the microwave signal is transmitted only along the first transmission line 22. Conductivity of the first bias line 01 and/or the second bias line 02 is less than 14500000 siemens/m; and when the first bias line 01 and/or the second bias line 02 are/is selected according to the size of the phase shifter, the lower the conductivity of the first bias line 01 and/or the second bias line 02, the better. In some examples, the material of the first bias line 01 and/or the second bias line 02 includes, but is not limited to, any one of Indium Tin Oxide (ITO), nickel (Ni), tantalum nitride (TaN), chromium (Cr), indium oxide ($In_2O_3$), and Tin Oxide ($Sn_2O_3$). In some implementations, the first bias line 01 and/or the second bias line 02 are/is made of ITO.

In some examples, the first transmission line 22 is made of a metal material. Specifically, the material of the first transmission line 22 is made of a metal, such as, but not limited to, aluminum, silver, gold, chromium, molybdenum, nickel or iron.

In some examples, the first base 11 may be made of a plurality of materials. For example, if the first base 11 is a flexible base, the material of the first base 11 may include at least one of polyethylene glycol terephthalate (PET) and Polyimide (PI); and if the first base 11 is a rigid base, the material of the first base 11 may be glass and the like. A thickness of the first base 11 may be about 0.1 mm to 1.5 mm. The second base 21 may also be made of a plurality of materials. For example, if the second base 21 is a flexible base, the material of the second base 21 may include at least one of polyethylene glycol terephthalate (PET) and Polyimide (PI); and if the second base 21 is a rigid base, the material of the second base 21 may also be glass and the like. A thickness of the second base 21 may be about 0.1 mm to 1.5 mm. The first base 11 and the second base 21 may also be made of the other materials that are not limited herein. The specific thicknesses of the first base 11 and the second base 21 may also be set according to a skin depth of an electromagnetic wave (a radio frequency signal).

In some examples, a thickness of the first dielectric layer 3 which is the liquid crystal layer is about 1 μm to 1 mm. Specifically, the thickness of the first dielectric layer 3 may be set according to the requirements for the size and a phase shift angle of the phase shifter. In addition, the first dielectric layer 3 in the embodiment of the present disclosure is made of a microwave liquid crystal material. For example, the liquid crystal molecules in the first dielectric layer 3 are positive liquid crystal molecules or negative liquid crystal molecules. It should be noted that, in a case where the liquid crystal molecules are positive liquid crystal molecules, an included angle between a long axis direction of the liquid crystal molecules and the second electrode is greater than 0° and smaller than or equal to 45° according to the embodiment of the present disclosure. In a case where the liquid crystal molecules are negative liquid crystal molecules, an included angle between the long axis direction of the liquid crystal molecules and the second electrode is larger than 45° and smaller than 90° according to the embodiment of the present disclosure. Thus, it may be ensured that the dielectric constant of the first dielectric layer 3 is changed after the liquid crystal molecules are deflected, thereby achieving phase shift.

In some examples, the first substrate further includes a first alignment layer (not shown) disposed on a side of the first reference electrodes 12 away from the first base 11; and a second alignment layer (not shown) disposed on a side of the first transmission lines 22 away from the second base 21. The first alignment layer and the second alignment layer are configured to align the liquid crystal molecules in the first dielectric layer 3. Both the first alignment layer and the second alignment layer may be made of polyimide materials. Thicknesses of the first alignment layer and the second alignment layer may be about 30 nm to 2 μm.

In a second aspect, an embodiment of the present disclosure further provides a driving method for a phase shifter, which is applied to the above phase shifter, and includes:

according to the phase shift amount required for a region where each first transmission line 22 is located, inputting the second bias voltage to the first transmission line 22 corresponding thereto, and separately inputting the first bias voltages to the plurality of first reference electrodes 12 corresponding thereto.

Specifically, when the phase shifter is applied to an antenna, phase compensations required by different radiating elements are different in a scanning process of the antenna, that is, the phase shift amounts required by the phase shift units in the regions where the different first transmission lines 22 are located are different, a correspondence table of driving voltage and phase shift amount may be preset in the control unit, the preset correspondence table is searched for a driving voltage according to the phase shift amount required by the region where the first transmission line 22 corresponding to one radiating element is located, and a corresponding first bias voltage and a corresponding second bias voltage are generated according to the found driving voltage, with a difference between the first bias voltage and the second bias voltage equal to the driving voltage.

In some examples, the first bias voltage and the second bias voltage may be voltages having a same value and opposite polarities. It should be noted that the first driving unit 001 or the second driving unit 002 has its own reference voltage, and a median of a voltage range thereof is usually used as the reference voltage. For example, if an output voltage range of the first driving unit 001 is 0V to 18V, 9V may be used as the reference voltage of the first driving unit 001, and whether the polarities of the first bias voltage and the second bias voltage are positive or negative is determined with respect to the reference voltage, that is, the first bias voltage or the second bias voltage smaller than the reference voltage (9V) has a negative polarity, and the first bias voltage or the second bias voltage greater than or equal to the reference voltage (9V) has a positive polarity. For example, assuming that the driving voltage required for the region where one first transmission line 22 is located in the phase shifter is xV, the first bias voltage may be set to (9+x/2)V, and the second bias voltage may be set to (9−x/2)V; since the LVDS data input to the driving unit (the first driving unit 001 or the second driving unit 002) are the same, i.e., (x/2)V, the first bias voltage and the second bias voltage may be obtained merely by selecting digital-to-analog converters having different polarities to change the polarities of the output voltages, so that a sufficient voltage different may be obtained to drive the phase shifter without adding extra data, and the second bias voltage of the first transmission line 22 and the first bias voltage of the first reference electrode 12 may be flexibly set for each region. Moreover, by reversing the polarities of the first bias voltage to the first reference electrode 12 and the second bias voltage to the first transmission line 22, it is possible to prevent the liquid crystal molecules in the first dielectric layer 3 from being polarized to cause a decrease in the performance of the phase shifter.

Taking a case where the phase shifter is applied to a 1×4 antenna array as an example, that is, simulation is performed based on a model of the phase shifter which includes phase shift units sequentially arranged along a same direction, and simulation results of port parameters (reflection characteristic Sii, transmission characteristic Sij), a gain (in normal direction) and a bandwidth (a relationship between the gain and a frequency), Sii in a vertical state of liquid crystal, Sii in a mixed state of liquid crystal, Sii in a parallel state of liquid crystal, Sij in the vertical state of liquid crystal, Sij in the mixed state of liquid crystal, Sij in the parallel state of liquid crystal, a normal radiation pattern in the vertical state of liquid crystal, a normal radiation pattern in the mixed state of liquid crystal, and a normal radiation pattern in the parallel state of liquid crystal are shown in the following table. In the table, ① represents an antenna adopting the phase shifter including the first reference electrode layer which is the surface electrode, ② represents an antenna adopting the phase shifter provided by the embodiment of the present disclosure, it can be seen from the table that the performance parameters of the two antennas are not greatly different, so that it can be verified that the phase shifter provided by the embodiment of the present disclosure has good performance.

| | | ① | ② |
|---|---|---|---|
| Vertical state | Sii impedance bandwidth, port parameters | 0.36 G, −33 dB | 0.36 G, −35 dB |
| Mixed state | Sii impedance bandwidth, port parameters | 0.2 G, −20 dB | 0.24 G, −20 dB |
| Parallel state | Sii impedance bandwidth, port parameters | 0.48 G, −10 dB | 0.48 G, −15 dB |
| Vertical state | Sij port isolation | −30 dB | −27 dB |
| Mixed state | Sij port isolation | −30 dB | −30 dB |
| Parallel state | Sij port isolation | −30 dB | −30 dB |
| Vertical state | Normal radiation pattern | 2.5 dB | 2.5 dB |
| Mixed state | Normal radiation pattern | 4.0 dB | 4.0 dB |
| Parallel state | Normal radiation pattern | 3.6 dB | 3.7 dB |

In a third aspect, an embodiment of the present disclosure further provides an antenna, including the above phase shifter.

In some examples, the antenna further includes a plurality of radiating elements 33, which are disposed on the side of the first base 11 away from the first dielectric layer 3. The radiating elements 33 are in one-to-one correspondence with the first transmission lines 22, and an orthographic projection of one radiating element 33 on the first base 11 at least partially overlaps that of the first transmission end 22*a* of the first transmission line 22 corresponding to the radiating element 33 on the first base 11.

In some examples, the radiating elements 33 are in one-to-one correspondence with the first reference electrodes 12, and the orthographic projection of one radiating element 33 on the first base 11 at least partially overlaps that of the first reference electrode 12 corresponding to the radiating element 33 on the first base 11; and the orthographic projection of each radiating element 33 on the first base 11 at least partially overlaps that of the first opening 121 of the first reference electrode 12 corresponding thereto on the first base 11, but does not overlap an orthographic projection of the second opening 122 of the first reference electrode 12 corresponding thereto on the first base 11. By a process of forming a metal on both sides of a glass substrate (the first base 11), the radiating elements 33 and the first reference electrodes 12 are respectively formed on two sides of the first base 11, and the first openings 121 are covered by the radiating elements 33 respectively and face the first transmission ends 22*a* of the first transmission lines 22 respectively. Taking a case where the first transmission end 22*a* is the sending end, the first transmission end 22*a* couples a microwave signal to the radiating element 33 through the first opening 121.

Figure 14:
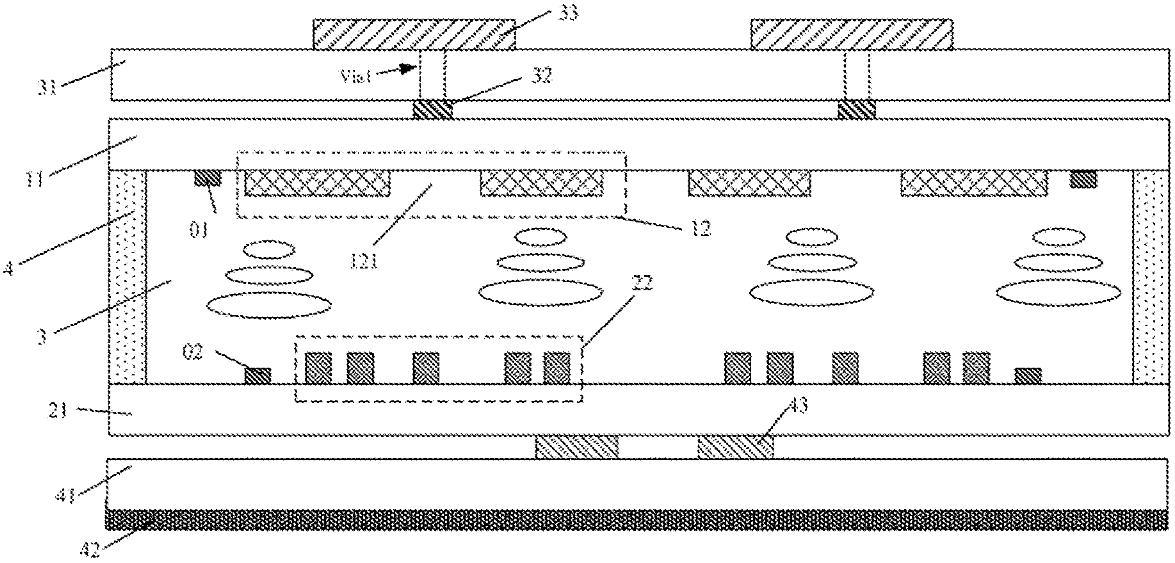
FIG. 14 is a schematic structural diagram of an antenna according to an embodiment of the present disclosure.

In some examples, with reference to FIG. 14, the radiating elements may be disposed in other manners, for example, the antenna further includes a third substrate disposed on a side of the first base 11 away from the first dielectric layer 3. The third substrate includes a third base 31, a plurality of radiating elements 33 disposed on a side of the third base 31 away from the first base 11, and a plurality of second transmission lines 32 disposed on a side of the third base 31 close to the first base 11. The third base 31 is provided therein with a plurality of first vias vial, first ends of the second transmission lines 32 are connected to the radiating elements 33 through the first vias vial one to one, and second ends of the second transmission lines 32 are aperture-coupled to the first transmission lines 22 through the first openings 121 of the first reference electrodes 12 one to one. Specifically, the second transmission lines 32 are in one-to-one correspondence with the first transmission lines 22, and an orthographic projection of the second end of the second transmission line 32 on the first base 11 at least partially overlaps that of the first transmission end 22*a* of the first transmission line 22 corresponding to the second transmission line 32 on the first base 11.

In some examples, the third substrate may be a PCB.

Figure 15:
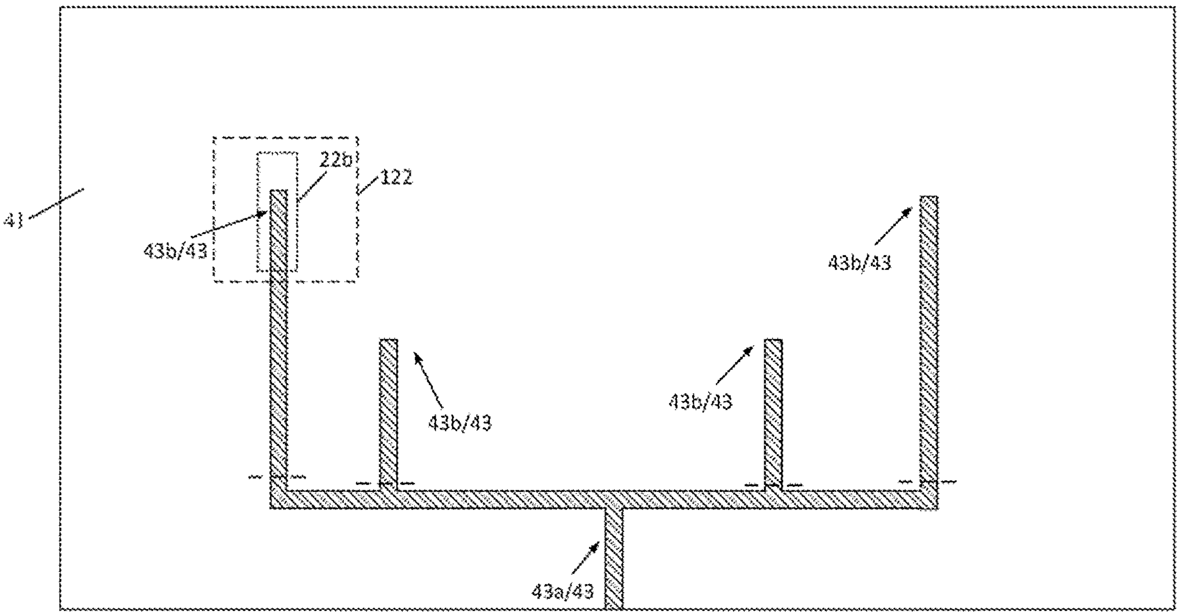
FIG. 15 is another schematic structural diagram of an antenna according to another embodiment of the present disclosure.

In some examples, with reference to FIG. 14 and FIG. 15, the antenna further includes a fourth substrate disposed on a side of the second base 21 away from the first dielectric layer 3. The fourth substrate includes a fourth base 41, a second reference electrode layer 42 disposed on a side of the fourth base 41 away from the second base 21, and a power-division transmission structure 43 disposed on a side of the fourth base 41 close to the second base 21. An orthographic projection of the power-division transmission structure 43 on the second base 21 at least partially overlaps that of the second reference electrode layer 41 on the second base 21, so that a microstrip line structure is formed. With reference to FIG. 15, the power-division transmission structure 43 includes one combining transmission line 43*a* and a plurality of power-division transmission lines 43*b*, first ends of the plurality of power-division transmission lines 43*b* are all connected to a first end of the combining transmission line 43*a*, and a second end of the combining transmission line 43*a* is connected to a radio frequency cable to receive the radio frequency signal; and the power-division transmission lines 43*b* are in one-to-one correspondence with the first transmission lines 22, and an orthographic projection of the second end of the power-division transmission line 43*b* on the fourth base 41 at least partially overlaps that of the second transmission end 22*b* of the first transmission line 22 corresponding to the power-division transmission line 43*b* on the fourth base 41. After receiving the radio frequency signal, the second end of the combining transmission line 43*a* performs power division on the radio frequency signal to obtain a plurality of sub-signals and inputs the sub-signals to the power-division transmission lines 43*b* respectively, and the power-division transmission lines 43*b* are coupled to the second transmission ends 22*b* of the first transmission lines 22 to couple the sub-signals to the first transmission lines 22.

In some examples, each first reference electrode 12 is further provided with the second opening 122. The power-division transmission lines 43*b* of the power-division transmission structure 43 are in one-to-one correspondence with the first reference electrodes 12, and the orthographic projection of the second end of the power-division transmission line 43*b* on the fourth base 41 at least partially overlaps that of the second opening 122 of the first reference electrode 12 corresponding to the power-division transmission line 43*b* on the fourth base 41.

In some examples, the power-division transmission structure 43 may be disposed on the side of the second base 21 close to the first dielectric layer 3, that is, the power-division transmission structure 43 is disposed in the same layer as the first transmission lines 22, and the second end of the power-division transmission line 43*b* is electrically connected to the second transmission end 22*b* of the first transmission line 22 corresponding to the power-division transmission line 43*b*. Moreover, a second reference electrode layer 41 is disposed on the side of the second base 21 away from the first dielectric layer 3. In this case, the fourth substrate is not needed, so that a thickness of the antenna may be reduced.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and those modifications and improvements are also considered to fall within the scope of the present disclosure.

What is claimed is:

1. A phase shifter, comprising a first substrate and a second substrate, which are disposed opposite to each other, and a first dielectric layer disposed therebetween; and the first substrate comprises: a first base, and a first reference electrode layer disposed on a side of the first base close to the first dielectric layer, the first reference electrode layer comprises a plurality of first reference electrodes insulated and spaced apart from one another, and each first reference electrode is provided with a first opening; and the second substrate comprises a second base, and a plurality of first transmission lines disposed on a side of the second base close to the first dielectric layer and spaced apart from one another;

wherein the first transmission lines are in one-to-one correspondence with the first reference electrodes, and an orthographic projection of the first transmission line on the second base at least partially overlaps that of the first reference electrode corresponding to the first transmission line on the second base; and each first transmission line has a first transmission end and a second transmission end, and an orthographic projection of the first transmission end of each first transmission line on the second base at least partially overlaps that of the first opening of the first reference electrode corresponding to the first transmission line on the second base.

2. The phase shifter of claim 1, wherein each first reference electrode is further provided with a second opening, and an orthographic projection of the first opening on the second base does not overlap that of the second opening on the second base; and an orthographic projection of the second transmission end of each first transmission line on the second base at least partially overlaps that of the second opening of the first reference electrode corresponding to the first transmission line on the second base.

3. The phase shifter of claim 1, further comprising a first driving unit comprising a plurality of first channels, a part of the first channels are connected to the first transmission lines one to one, another part of the first channels are connected to the first reference electrodes one to one, and the first driving unit is configured to supply a first bias voltage to each first reference electrode through the first channel and supply a second bias voltage to each first transmission line through the first channel.

4. The phase shifter of claim 3, wherein the first substrate further comprises a plurality of first bias lines disposed on the side of the first base close to the first dielectric layer, and each first bias line is connected between one first channel and one first reference electrode; and the second substrate further comprises a plurality of second bias lines disposed on the side of the second base close to the first dielectric layer, and each second bias line is connected between one first channel and one first transmission line.

5. The phase shifter of claim 1, further comprising a first driving unit and a second driving unit; and the first driving unit comprises a plurality of first channels, the first channels are connected to the first reference electrodes one to one, and the first driving unit is configured to supply a first bias voltage to each first reference electrode through the first channel; and the second driving unit comprises a plurality of second channels, the second channels are connected to the first transmission lines one to one, and the second driving unit is configured to supply a second bias voltage to each first transmission line through the second channel.

6. The phase shifter of claim 5, wherein the first substrate further comprises a plurality of first bias lines disposed on the side of the first base close to the first dielectric layer, and each first bias line is connected between one first channel and one first reference electrode; and the second substrate further includes a plurality of second bias lines disposed on the side of the second base close to the first dielectric layer, and each second bias line is connected between one first channel and one first transmission line.

7. The phase shifter of claim 1, wherein each first transmission line further comprises a transmission body; each of the first transmission end and the second transmission end has a first endpoint and a second endpoint, which are disposed opposite to each other; and the first endpoint of the first transmission end and that of the second transmission end are connected with two opposite ends of the transmission body respectively.

8. The phase shifter of claim 7, wherein the transmission body includes a planar spiral transmission line electrically connected with the first transmission end and the second transmission end.

9. The phase shifter of claim 7, wherein the transmission body comprises at least one meandering line electrically connected with the first transmission end and the second transmission end; and an orthographic projection of the at least one meandering line on the first base has a portion intersecting with an extending direction of an orthographic projection of the first transmission end on the first base.

10. An antenna, comprising the phase shifter of claim 1.

11. The antenna of claim 10, further comprising a plurality of radiating elements, which are disposed on a side of the first base away from the first dielectric layer; and the radiating elements are in one-to-one correspondence with the first transmission lines, and an orthographic projection of the radiating element on the first base at least partially overlaps that of the first transmission end of the first transmission line corresponding to the radiating element on the first base.

12. The antenna of claim 11, wherein the radiating elements are in one-to-one correspondence with the first reference electrodes, and the orthographic projection of the radiating element on the first base at least partially overlaps that of the first reference electrode corresponding to the radiating element on the first base; and the orthographic projection of each radiating element on the first base at least partially overlaps that of the first opening of the first reference electrode corresponding to the radiating element on the first base.

13. The antenna of claim 12, wherein each first reference electrode is further provided with the second opening, and the orthographic projection of each radiating element on the first base does not overlap that of the second opening of the first reference electrode corresponding to the radiating element on the first base.

14. The antenna of claim 10, further comprising a third substrate disposed on the side of the first base away from the first dielectric layer;

wherein the third substrate comprises a third base, a plurality of radiating elements disposed on a side of the third base away from the first base, and a plurality of second transmission lines disposed on a side of the third base close to the first base; and the third base is provided therein with a plurality of first vias, and first ends of second transmission line are connected to the radiating elements through the first vias one to one; and the second transmission lines are in one-to-one correspondence with the first transmission lines, and an orthographic projection of a second end of the second transmission line on the first base at least partially overlaps that of the first transmission line corresponding to the second transmission line on the first base.

15. The antenna of claim 10, further comprising a fourth substrate disposed on the side of the second base away from the first dielectric layer;

wherein the fourth substrate comprises a fourth base, a second reference electrode layer disposed on a side of the fourth base away from the second base, and a power-division transmission structure disposed on a side of the fourth base close to the second base;

an orthographic projection of the power-division transmission structure on the second base at least partially overlaps that of the second reference electrode layer on the second base; and the power-division transmission structure comprises one combining transmission line and a plurality of power-division transmission lines, and a first end of each of the plurality of power-division transmission lines is connected to a first end of the combining transmission line; and an orthographic projection of a second end of each power-division transmission line on the fourth base at least partially overlaps that of the second transmission end of one first transmission line.

16. The antenna of claim 15, wherein each first reference electrode is further provided with the second opening; the power-division transmission lines are in one-to-one correspondence with the first reference electrodes, and the orthographic projection of the second end of the power-division transmission line on the fourth base at least partially overlaps that of the second opening of the first reference electrode corresponding to the power-division transmission line on the fourth base.

17. A driving method for a phase shifter, which is applied to the phase shifter of claim 1, comprising:

according to a phase shift amount required for a region where each first transmission line is located, separately inputting a corresponding first bias voltage to each first reference electrode, and separately inputting a corresponding second bias voltage to each first transmission line.

18. An antenna, comprising the phase shifter of claim 2.

19. The antenna of claim 18, further comprising a plurality of radiating elements, which are disposed on a side of the first base away from the first dielectric layer; and the radiating elements are in one-to-one correspondence with the first transmission lines, and an orthographic projection of the radiating element on the first base at least partially overlaps that of the first transmission end of the first transmission line corresponding to the radiating element on the first base.

20. The antenna of claim 19, wherein the radiating elements are in one-to-one correspondence with the first reference electrodes, and the orthographic projection of the radiating element on the first base at least partially overlaps that of the first reference electrode corresponding to the radiating element on the first base; and the orthographic projection of each radiating element on the first base at least partially overlaps that of the first opening of the first reference electrode corresponding to the radiating element on the first base.

* * * * *